United States Patent
Khoo et al.

(10) Patent No.: US 9,473,882 B2
(45) Date of Patent: Oct. 18, 2016

(54) ENHANCED LOCATION DATA THROUGHPUT ON A WINDOWED DATA CHANNEL IN A RADIO COMMUNICATION SYSTEM

(71) Applicant: MOTOROLA SOLUTIONS, INC, Schaumburg, IL (US)

(72) Inventors: Hun Weng Khoo, Gelugor (MY); Dipendra M Chowdhary, Hoffman Estates, IL (US); Yueh Ching Chung, Georgetown (MY); Xiao-Yu Li, Chengdu (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 171 days.

(21) Appl. No.: 14/305,345

(22) Filed: Jun. 16, 2014

(65) Prior Publication Data
US 2015/0365920 A1  Dec. 17, 2015

(51) Int. Cl.
*H04W 4/02* (2009.01)
*H04W 72/04* (2009.01)

(52) U.S. Cl.
CPC .......... *H04W 4/02* (2013.01); *H04W 72/0406* (2013.01); *H04W 72/0446* (2013.01)

(58) Field of Classification Search
CPC ......... G01S 5/14; G01S 5/145; H04L 47/10; H04L 47/15; H04L 47/18; H04L 47/22; H04L 47/225; H04L 47/27; H04W 4/02; H04W 4/025; H04W 4/08; H04W 72/0406; H04W 72/0413; H04W 72/042; H04W 72/0446
See application file for complete search history.

(56) References Cited

U.S. PATENT DOCUMENTS

| | | | |
|---|---|---|---|
| 5,163,046 A * | 11/1992 | Hahne | H04L 47/10 370/237 |
| 6,876,858 B1 | 4/2005 | Duvall et al. | |
| 6,885,874 B2 | 4/2005 | Grube et al. | |
| 7,009,948 B1 | 3/2006 | Carlsson et al. | |
| 7,986,952 B2 | 7/2011 | Orler et al. | |
| 8,284,737 B2 | 10/2012 | Rosen et al. | |
| 8,548,026 B2 | 10/2013 | Kanterakis | |
| 2010/0111052 A1 | 5/2010 | Erceg et al. | |
| 2012/0069786 A1* | 3/2012 | Wiatrowski | G01S 5/14 370/315 |
| 2012/0127973 A1 | 5/2012 | Lin et al. | |

FOREIGN PATENT DOCUMENTS

WO  2012047178 A1  4/2012
WO  2013064871 A1  5/2013

* cited by examiner

*Primary Examiner* — Khoa Huynh

(57) ABSTRACT

A method for enhanced data throughput on a windowed revert repeater channel in a radio communication system includes requesting, by a subscriber unit and via a control channel of the radio communication system, a window in which to transmit data updates on the windowed revert repeater channel of the radio communication system; receiving, by the subscriber unit and via the control channel, an assigned window on the windowed revert repeater channel for the data updates; monitoring, by the subscriber unit, the control channel repeater and determining a timing of the windowed revert repeater channel based on the monitoring; and reverting to the windowed revert repeater channel based on the timing and the assigned window, and transmitting the data updates during the assigned window. A subscriber unit and radio communication system are also disclosed.

8 Claims, 16 Drawing Sheets

US 9,473,882 B2

ENHANCED LOCATION DATA THROUGHPUT ON A WINDOWED DATA CHANNEL IN A RADIO COMMUNICATION SYSTEM

BACKGROUND OF THE INVENTION

The present disclosure relates generally to radio communication systems. In typical radio communication systems, various subscribers communicate with one another either in a direct mode or an infrastructure mode transmitting voice, video, or other data (generally "data") on working channels, which are predetermined frequencies and timeslots. The working channels can be random access channels which can be different depending on the message direction, e.g., an inbound (or uplink) channel is used for communications from the subscriber to the base station and an outbound (or downlink) channel is used for communications from the base station or repeater to the subscriber. When a subscriber wishes to transmit data to other subscribers, the subscriber first determines the status of the uplink channel—i.e., whether it is busy or idle. For example, in European Telecommunications Standards Institute Digital Mobile Radio (ETSI-DMR) systems, the downlink channel periodically transmits a CACH (Common Announcement Channel) burst that indicates the status of the uplink channel. Other types of radio communication systems such as Terrestrial Trunked Radio (TETRA), Project 25 (P25), Digital Mobile Radio (DMR), Land Mobile Radio (LMR), Motorola Trunked Radio, and the like may include similar mechanisms.

In many radio communication systems, the subscriber is required to monitor the uplink channel for an extended period of time prior to attempting to transmit data or the subscriber is required to request an opportunity to transmit data on the uplink channel. Once the subscriber determines that the uplink channel is idle, or after receiving a grant to transmit on the uplink channel, the subscriber may attempt to transmit the data to the base station or the repeater. If a large number of subscribers use the same uplink channel, multiple subscribers may attempt to transmit these requests at the same time, causing collisions between the requests. Base stations receiving multiple colliding messages at the same time typically do not respond to the messages as they mutually interfere with one another, causing each message to be eventually be retransmitted by the respective subscriber. Adding to this, communication systems also typically require a confirmation message be sent to the subscriber on the outbound channel to confirm receipt of the request from the subscriber. This increases the bandwidth usage on the outbound channel as well as further increasing the amount of time it takes to transmit the data from the subscriber on the uplink channel.

These problems have become increasingly problematic due to an increased desirability of tracking a locations of the subscribers, and doing so more often, using the Global Positioning System (GPS) or other location determination systems. As subscriber location information presents a heavy traffic load on a channel due to its frequent transmission and in order to minimize the impact that location data might have on other data traffic, such as voice traffic, the location data can be transmitted on a dedicated random access channel. As it is likely that the desirability for location tracking will only increase, and therefore the number of devices being tracked correspondingly increase, it is therefore desirable to provide a mechanism for location tracking using revert repeater channel(s) in which a number of dedicated revert channels and the amount of infrastructure employed, and thus an incurred cost, is reduced and in which the amount of time for channel access is minimized.

To improve GPS data throughput, a windowed data channel architecture has been introduced whereby each subscriber is assigned a window on a revert channel to transmit location data. For example, subscribers use a secondary (revert) channel to schedule and transmit updates to a repeater. The channel is structured to support non-contention based communication windows during which the location information is transmitted to the repeaters, i.e., a specific different window is assigned to each subscriber. This significantly improves the throughput of GPS or other location data in radio communication systems.

While the windowed data channel significantly improves GPS throughput, it requires each subscriber to request access for a data window from a windowed revert repeater channel in every roam. This is in addition to normal registration and is inefficient. Further, to accommodate a large number of subscribers in a GPS revert feature on the windowed revert repeater channel, a large number of windowed revert repeater channels is required.

Accordingly, there is a need for an improved method and system for transmitting periodic data such as location data on a windowed revert repeater channel in a radio communication system.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
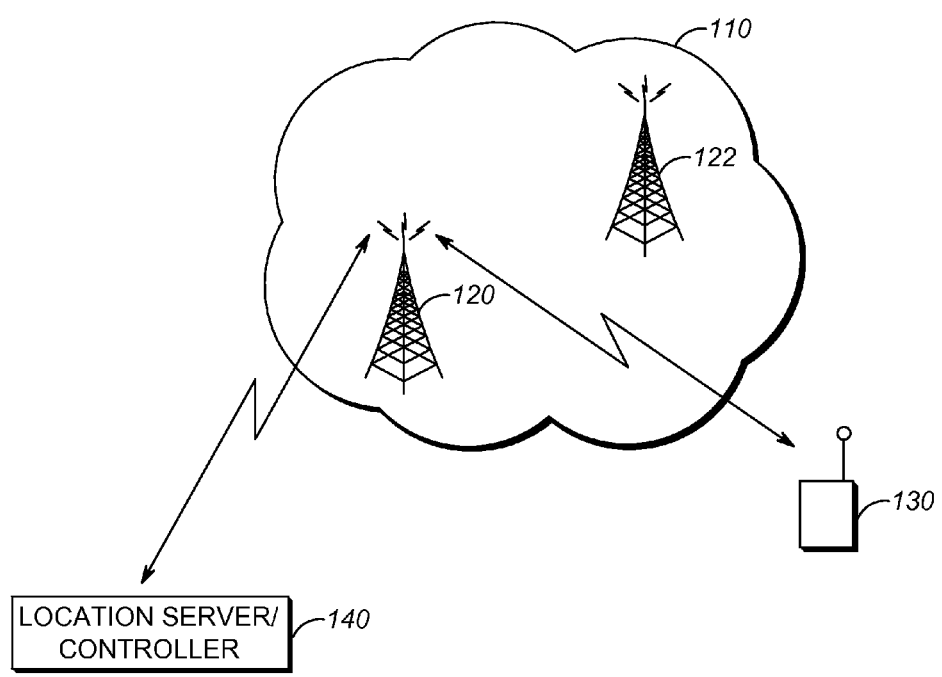
FIG. 1 is a network diagram of a radio communication system for illustration of enhanced location data throughput in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment, a method for enhanced data throughput on a windowed revert repeater channel in a radio communication system includes requesting, by a subscriber unit and via a control channel of the radio communication system, a window in which to transmit data updates on the windowed revert repeater channel of the radio communication system; receiving, by the subscriber unit and via the control channel, an assigned window on the windowed revert repeater channel for the data updates; monitoring, by the subscriber unit, the control channel repeater and determining a timing of the windowed revert repeater channel based on the monitoring; and reverting to the windowed revert repeater channel based on the timing and the assigned window, and transmitting the data updates during the assigned window.

In another exemplary embodiment, a subscriber unit communicating in a radio communication system and utilizing enhanced data throughput on a windowed revert repeater channel includes a transceiver communicating on the radio communication system; a processor communicatively coupled to the transceiver; and memory storing instructions that, when executed, cause the processor to: request, by the transceiver and via a control channel of the radio communication system, a window in which to transmit data updates on the windowed revert repeater channel of the radio communication system; receive, by the transceiver and via the control channel, an assigned window on the windowed revert repeater channel for the data updates; monitor, by transceiver unit, the control channel repeater and determine a timing of the assigned window based thereon; and revert to the windowed revert repeater channel based on the timing and transmit the data updates in the assigned window.

In yet another exemplary embodiment, a radio communication system utilizing enhanced data throughput on a windowed revert repeater channel includes a plurality of subscriber units; a plurality of repeaters communicatively coupled to the plurality of subscriber units; a location server communicatively coupled to the plurality of subscriber units via the plurality of repeaters; one or more revert repeater channels between the plurality of repeaters and the plurality of subscriber units; and a control channel between the plurality of repeaters and the plurality of subscriber units; wherein the plurality of subscriber units provide periodic data updates to the location server based on predetermined and assigned windows on the one or more revert repeater channels, the assigned windows being communicated to the subscriber units via the control channel.

In various exemplary embodiments, enhanced location data throughput on a windowed data channel is described in a radio communication system. Advantageously, the enhanced location data throughput is achieved through current window number announcements for a windowed revert repeater channel on a physical control channel repeater and the use of the physical control channel repeater for scheduling. The enhanced location data throughput improves throughput by removing window requests on the windowed revert repeater channel. Specifically, the window is requested/assigned during registration or as an explicit request providing a deterministic process which further improves throughput as opposed to random access requests. Advantageously, knowledge of window assignments by various subscriber units allows call grant synchronization avoiding late entry. For example, the enhanced location data throughput can include an effective method to send GPS in a radio communication system through a repeater assigning a revert repeater channel, a window to a subscriber unit upon registration or via an explicit request; a control channel repeater broadcasting window information (e.g., current window timing); and the subscriber unit calculating the exact time to switch to the revert repeater channel to send data, such as location updates, for example. The enhanced location data throughput can support various window sizes (e.g., 1 to 10) and various update rates (e.g., 7.5 s, 15 s, 30 s, 1 min, 2 min, 4 min, 8 min, etc.). Benefits of the enhanced location data throughput include removal of an outbound signal for location targeting to wireline console and hence frequency usage is improved, improved location data throughput to accommodate more users since no random access is required, no late entry call for a subscriber unit that is sending location or GPS data, and no need to re-program the subscriber units when new windowed revert repeater channel is added.

FIG. 1 is a network diagram of a radio communication system 100 for illustration of enhanced location data throughput in accordance with some embodiments. The radio communication system 100 includes an infrastructure 110 with many distributed elements therein, some local to each other and others disposed geographically distant from each other. For example, the distributed elements can include one or more repeaters 120, 122 which provide connectivity to subscriber units 130 disposed within a coverage area serviced by the repeater 120 to other devices either in the same coverage area or in a different coverage area through the infrastructure 110. The repeaters 120, 122 are configured to retransmit information received, and the repeaters 120, 122 can include a plurality of repeaters that are capable of receiving and retransmitting messages amongst the subscriber units 130. One repeater 120 may be local to or service a particular subscriber units 130 and act as a slave to a scheduling repeater 122 (called herein a scheduler). The infrastructure 110 can also include various other elements not shown in FIG. 1 for simplicity of illustration. The infrastructure 110 can be connected to a number of additional content sources, such as the Internet or various Intranets and can include multiple interconnected zones, each containing a zone controller, base sites, data servers, and the like. The infrastructure 110 can also be linked to a public switched telephone network (PSTN), a public safety network, commercial cellular networks (e.g., Long Term Evolution (LTE)), other radio networks, and the like.

The subscriber units 130 can be mobile or portable wireless radio units, cellular radio/telephones, smart phones, access terminals, mobile devices, user equipment, tablets, or any other type of device capable of wirelessly communicating with the infrastructure 110. In an exemplary application, the subscriber units 130 can be used by emergency personnel or public safety personnel, and the subscriber units 130 can be communicatively coupled to various other devices such as video terminals, portable computers, or the like. The infrastructure 110 can include other elements such as a controller which can allocate radio frequency (RF) communication resources amongst the subscribers 130. The controller may be disposed at one location or may be distributed among the repeaters 120, 122. In an exemplary embodiment, the radio communication system 100 can include TETRA, P25, DMR, LMR, Motorola Trunked Radio, and the like as well as variants of the aforementioned technologies.

One or more location servers 140 may be disposed at various locations. The one or more location servers 140 can also be combined with the controller or zone controller mentioned above. The repeaters 120, 122, after receiving a location update from the subscriber units 130, either provide this information to the appropriate location server(s) 140 directly without repeating the information or repeat the information to a controller, which then provides the location update to the location server 140. The location server(s) 140 stores, displays (or otherwise provides) and/or manipulates the location data as desired. A particular set of subscribers units 130 can be associated with the location server(s) 140 due to geographic and/or logical reasons. In various exemplary embodiments, the location server 140 may keep track of all subscriber units 130 within one or more limited geographic areas (e.g., local to the location server 140) or all subscribers in one or more talkgroups (e.g., identified group of related subscriber units, such that a transmission by one subscriber unit to the identified talkgroup is provided to all other subscriber units associated with the identified talkgroup).

Figure 2:
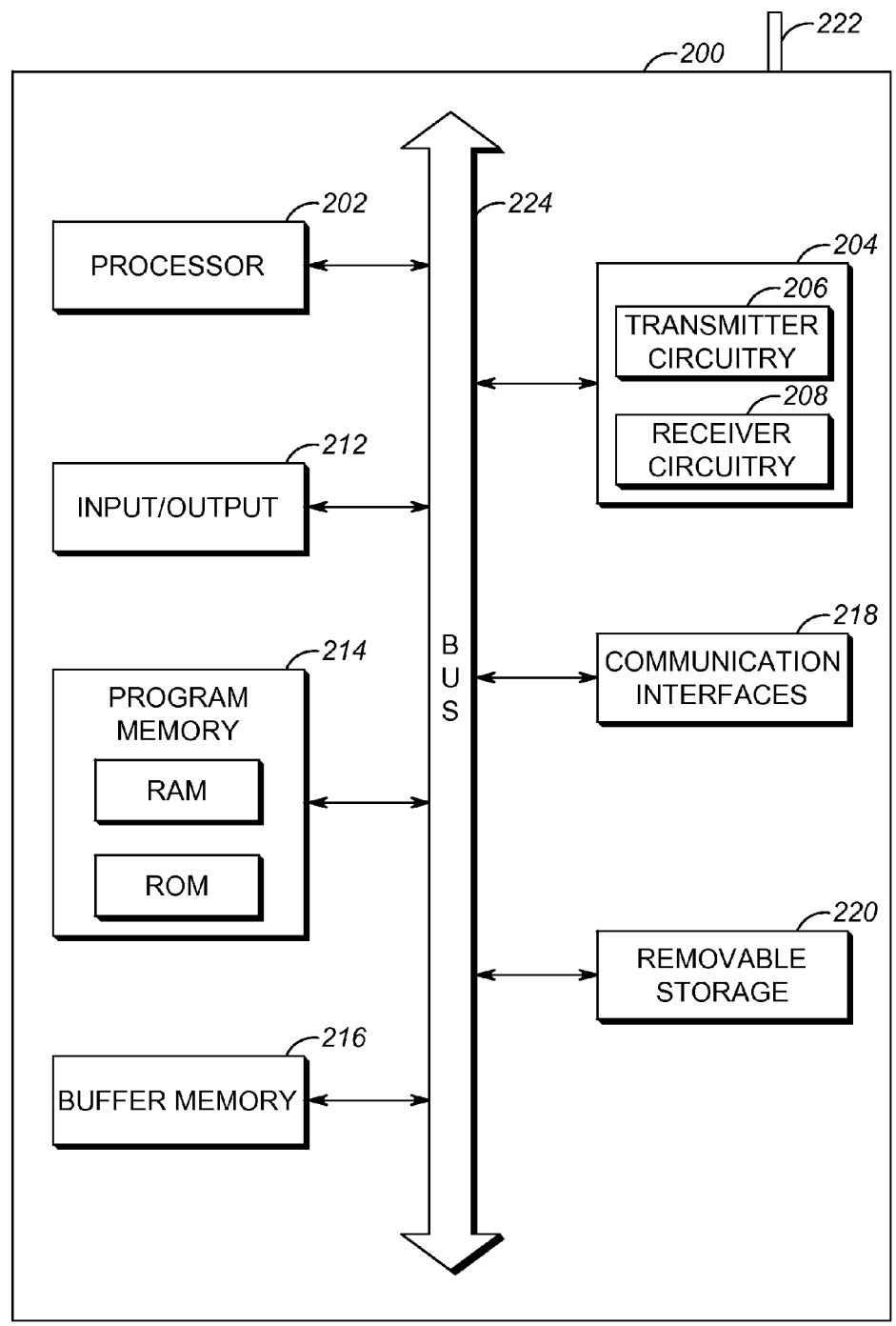
FIG. 2 is a block diagram of an exemplary implementation of a communication device such as the subscriber unit or the repeater in the radio communication system of FIG. 1 in accordance with some embodiments.

FIG. 2 is a block diagram of an exemplary implementation of a communication device 200 such as one of the subscriber units 130 or the repeater 120, 122. The communication device 200 can include, among other components omitted for illustration purposes, a processor 202, a transceiver 204 including transmitter circuitry 206 and receiver circuitry 208, input/output (I/O) devices 212, a program memory 214, a buffer memory 216, one or more communication interfaces 218, removable storage 220, and an antenna 222. The communication device 200 can be an integrated unit and may contain at least all the elements depicted in FIG. 2 as well as any other element necessary for the communication device 200 to perform its electronic functions. The various elements are connected by a bus 224.

The processor 202 is a hardware device for executing software instructions. The processor 202 can be any custom made or commercially available processor, a central processing unit (CPU), an auxiliary processor among several processors associated with the communication device 200, a semiconductor-based microprocessor (in the form of a microchip or chip set), or generally any device for executing software instructions. When the communication device 200 is in operation, the processor 202 is configured to execute software stored within the program memory 214, to communicate data to and from various elements, and to generally control operations of the communication device 200 pursuant to the software instructions. The program memory 214 can be an integrated circuit memory chip containing any form of random access memory (RAM) and/or read only memory (ROM), a compact disk (CD) ROM, a hard disk drive, a digital video disk (DVD), a flash memory card or any other medium for storing digital information. One of ordinary skill in the art will recognize that when the processor 202 has one or more of its functions performed by a state machine or logic circuitry, the program memory 214 containing the corresponding operational instructions may be embedded within the state machine or logic circuitry. The operations performed by the processor 202 and the rest of the communication device 200 are described in detail below, including for example, one or more of the functions described with respect to FIGS. 5-15.

The transmitter circuitry 206 and the receiver circuitry 208 enable the communication device 200 to transmit and/or receive, respectively, communication signals wirelessly such as in the radio communication system 100. In this regard, the transmitter circuitry 206 and the receiver circuitry 208 include appropriate circuitry to enable wireless transmissions. The implementations of the transmitter circuitry 206 and the receiver circuitry 208 depend on the implementation of the communication device 200 and the devices with which it is to communicate. For example, the transmitter circuitry 206 and the receiver circuitry 208 may be implemented as part of the communication device hardware and software architecture in accordance with known techniques. One of ordinary skill in the art will recognize that most, if not all, of the functions of the transmitter or receiver circuitry 206, 208 may be implemented in a processor, such as the processor 202. However, the processor 202, the transmitter circuitry 206, and the receiver circuitry 208 have been artificially partitioned herein to facilitate a better understanding. The buffer memory 216 may be any form of volatile memory, such as RAM, and is used for temporarily storing received or transmit information. The communication device 200 may also contain a variety of devices for the I/O devices 212 such as a keyboard with alpha-numeric keys, a display that displays information about the repeater or communications connected to the repeater, soft and/or hard keys, touch screen, jog wheel, a microphone, and a speaker.

Figure 3:
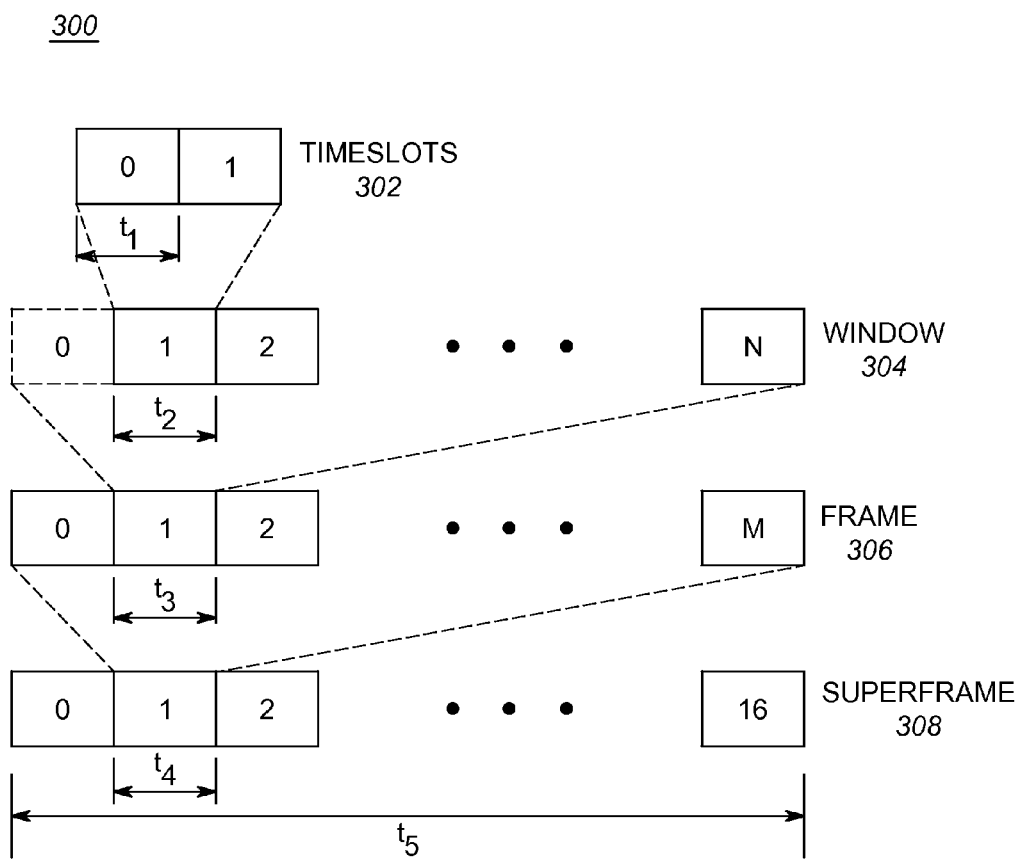
FIG. 3 is a frame diagram of a windowed data channel structure for use in the radio communication system of FIG. 1 in accordance with some embodiments.

FIG. 3 is a frame diagram of a windowed data channel structure 300 for use in the radio communication system 100. The windowed data channel structure 300 includes timeslots 302, windows 304, frames 306, and data superframes 308. The timeslots 302 are defined in various standards and can be standard time division multiple access (TDMA) timeslots. In an exemplary embodiment, each of the timeslots occupies $t_1$=30 ins (although in other embodiments, this may vary). As the timeslots 302 on a TDMA channel operate completely independently from one another and may not have the same windowing structure, alignment between announcement frames for one timeslot with announcement frames with the other timeslot may not coincide (although they are shown as being aligned in FIG. 3). In other embodiments, one or more of the timeslots 302 may be serving in some other capacity rather than providing scheduled location updates. In one particular example, an ETSI-DMR structure can use two independent timeslots (thus $t_2=60$ ms). In other embodiments, however, a larger or smaller number of timeslots may be used.

For subscribers, each of the timeslots 302, when not idle, is occupied by a burst of voice, data, or control information (also called a burst) at a particular rate dependent on which of the timeslots 302 the burst occupies. In this exemplary embodiment, bursts within each timeslot are 27.5 ms long with a 1.25 ms guard time (either idle or used for common announcement channel (CACH) transmission) at each end of the burst. As the timeslots 302 may essentially operate independently, for convenience the following discussion focuses on only one set of the timeslots 302 used by a subscriber (understanding that there are one or more intervening independent timeslots between each of the timeslots 302 in the set of timeslots).

The window 304 is formed from N timeslots 302, where N is an integer, and occupies a time period $t_2$ dependent on N. In some exemplary embodiments, N may be 1-10 and thus $t_3$ in one embodiment ranges from 60 ms-600 ms. The window 304 is defined to be one or more contiguous timeslots 302 that are required for the subscriber unit 130 to transmit a data message on the uplink to the repeater 120, 122. Note, an announcement control signaling block (CSBK) is not required before the actual location data can be sent on the outbound on windowed revert repeater channel.

The data frame (or frame) 306 is defined to be a sequence of all whole windows 304 in a predetermined second interval. In one example, this second interval is 30 s ($t_4=30$ s). In this embodiment, all the windows 304 in a frame 306 are of the same size. The number of complete windows 304 in a frame 306 depends on the size of windows 304 being used on the channel. For example, in a frame 306: there are 100 windows 304 (each being 300 ms) of 5 timeslots 302; 83 windows 304 of 6 timeslots 302, in which case the last 2 timeslots 302 are unused (and thus may be used for other purposes); 71 windows 304 of 7 timeslots 302, in which case the last 3 timeslots 302 are unused; 62 windows 304 of 8 timeslots 302, in which case the last 4 timeslots 302 are unused; 55 windows 304 of 9 timeslots 302, in which case the last 5 timeslots 302 are unused; and 50 windows 304 of 10 timeslots 302.

The data superframe 308 is defined to be a sequence of N (herein 16) frames 306, and is in one example 8 minutes long ($t_5=8$ min). In some exemplary embodiments, there are 1600 windows 304 of 5 timeslots 302 available in a data superframe 308, there are 1328 windows 304 of 6 timeslots 302 available in a data superframe 308, etc. The values $t_1$-$t_5$ may vary in different systems.

Subscribers can request times to update their location data as desired, e.g., from once each frame (i.e., every 30 s) to once each data superframe (i.e., every 8 minutes) and various points in between, 60 sec, 120 sec, 240 sec., etc. The following table illustrates various window sizes for location updates in a single site (clear and encrypted) and for a wide area (clear and encrypted).

| window size | number of windows |
|---|---|
| 2 | 250.00 |
| 3 | 166.67 |
| 4 | 125.00 |
| 5 | 100.00 |
| 6 | 83.33 |
| 7 | 71.43 |
| 8 | 62.50 |
| 9 | 55.56 |
| 10 | 50.00 |
| 11 | 45.45 |
| 12 | 41.67 |

Figure 4:
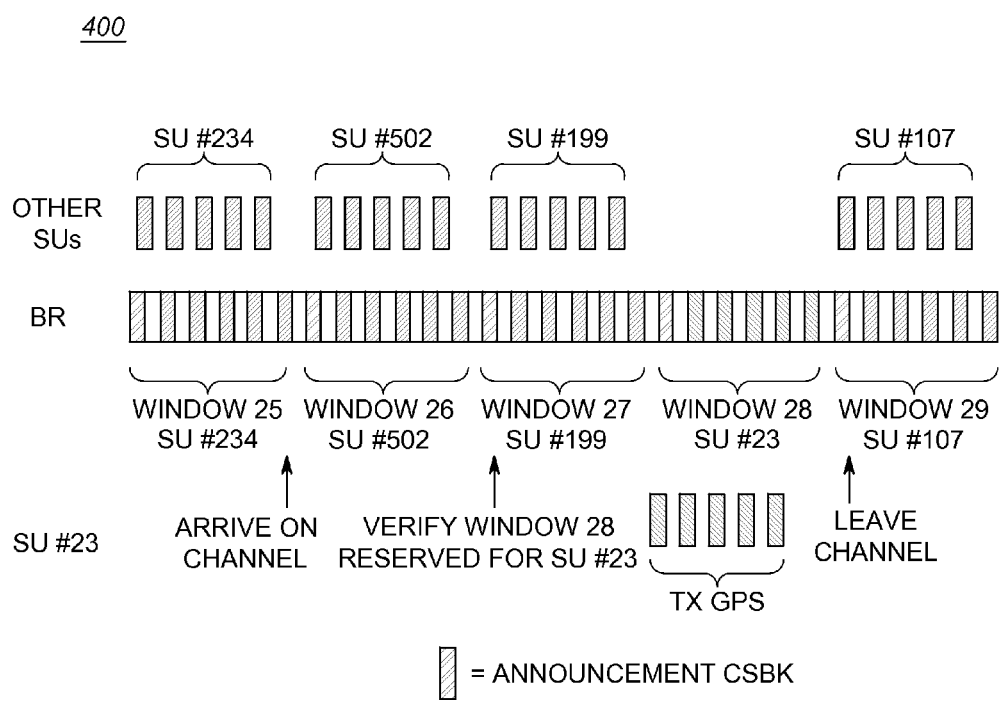
FIG. 4 is a diagram of a general sequence of transmitting on a reserved window such as the windowed data channel structure of FIG. 3 in accordance with some embodiments.

FIG. 4 is a diagram of a general sequence of transmitting on a windowed revert repeater channel 400 in conventional operation. Of note, the subscriber units 130, conventionally, have to reserve a window in the windowed revert repeater channel 400 via the windowed revert repeater channel, which is inefficient. The present enhanced location throughput systems and methods seek to avoid this requirement to further improve the throughput of location updates in the radio communication system 100. In the example of FIG. 4, a subscriber unit (SU) #23 is transmitting a location update (TX GPS) on window #28, and other SUs (SU #234, #502, #199, #107) are also transmitting on the windowed revert repeater channel 400. Before transmitting on the windowed revert repeater channel 400, conventionally, the SU #23 must verify its window is still reserved for it. The SU #23 arrives on the windowed revert repeater channel 400 one window earlier than its reserved window to account for synchronization, color code and time slot identification (this could take between 100 to 290 ms). The SU #23 decodes the announcement CSBK in the window preceding its reserved window to verify the identifier (ID) in the CSBK announcement matches its SU identifier (SUID). If the window is no longer reserved, the SU #23 must perform a new request. For the enhanced location data throughput described herein, the radio will just move to the windowed revert repeater channel 400 to transmit based on window timing it learns from the control channel repeater. Once a radio has successfully registered and obtained a window and windowed revert repeater channel from the trunking system, it will periodically transmit GPS data on the assigned window until the radio has been de-registered.

Figure 5:
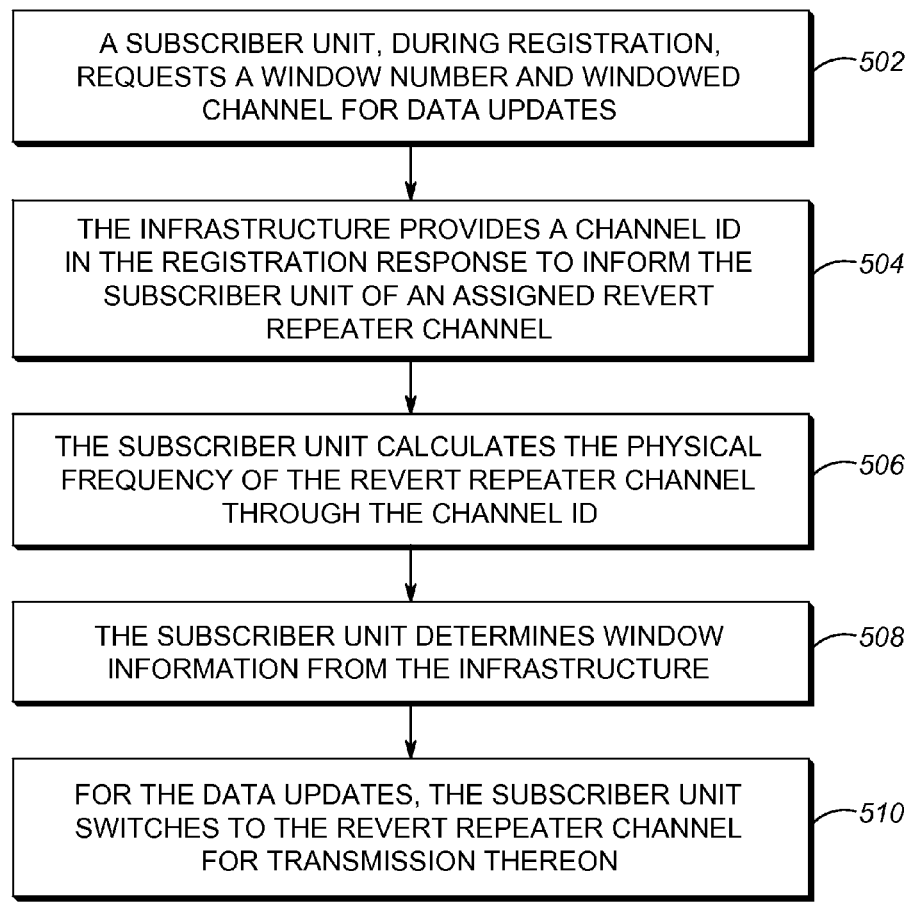
FIG. 5 is a flowchart of a method for enhanced location data throughput on a windowed revert repeater channel in a radio communication system such as in FIG. 1 in accordance with some embodiments.

FIG. 5 is a flowchart of a method 500 for enhanced periodic data throughput, such as location data, on a windowed revert repeater channel such as the windowed revert repeater channel 400 of FIG. 4 in a radio communication system in accordance with some embodiments. The method 500 assumes all the repeaters used in the radio communication system are timing synchronized. In other words, the control channel repeater and the windowed revert repeater channels are all timing synchronized with one another. The method 500 can utilize a control channel repeater to broadcast a current window number on an adjacent slot to control channel through window announcement CSBK 1000 bursts or CACH Short link control (LC) window announcements 1100. A subscriber unit monitors the adjacent slot to the control channel or CACH short link control for current window number announcements in addition to normal control channel monitoring. The subscriber unit learns the timing of the windowed revert repeater channel from the control channel repeater and uses the timing information to deduce the exact timeslot/window to switch to the windowed revert repeater channel for data update transmission. The subscriber unit may request a window (which is defined by a window number and windowed channel) with a requested window size and update rate in the same registration step after the subscriber unit roams to a new site or first powers on within a particular site.

Since the subscriber unit learns the window timing of windowed revert repeater channel when it is on the control channel repeater, it can switch to the windowed revert repeater channel and send data updates such as GPS efficiently when the time comes. For location data which is more than one burst, the system has knowledge of when a subscriber is away from the control channel. The system knows the SUID and its affiliated talkgroup ID. It can then optimize broadcast of a channel grant to mitigate late entry to a new call. For location data with one burst, the subscriber unit can just move to the windowed revert repeater channel to send a burst and come back to the control channel. The subscriber unit does not miss a new call grant (e.g., which is conventionally sent at least two times on the control channel) as it is only away from the control channel for a burst duration. For example, the subscriber unit can revert to a windowed revert repeater channel to transmit in the window for a single burst, return to the control channel after the single burst; and avoid a late entry into a new call due to a new call grant being sent two times with appropriate timing (typically 90 ms) between them and since the subscriber unit is away from the control channel for the single burst. Further, for a long burst greater than the single burst, the subscriber unit can avoid a late entry into a new call due to a new call grant being sent based on the radio communication system knowing the subscriber unit is away from the control channel and sending the new call grant accordingly, e.g., withholding the new call grant until the radio communication system knows the subscriber unit is most likely back monitoring the control channel.

Also, as the subscriber unit receives a channel number of the windowed revert repeater channel from the system, the system can add windowed revert repeater channels without the need to reprogram the subscriber unit in the field. Specifically, conventional radios learn about the windowed revert repeater channels through pre-programmed data in the radios, thus adding additional windowed revert repeater channels requires the radios in the field to be re-programmed. The enhanced data throughput systems and methods make radio re-programming unnecessary when a new windowed revert repeater channel is added as the windowed revert repeater channel is provided to the subscriber unit via over the air (OTA) signaling. For example, a new windowed revert repeater channel is simply assigned OTA.

Additionally, no corresponding outbound channels are needed for each inbound windowed revert repeater channel since the subscriber unit learns the window timing and current window number via the control channel repeater, allowing outbound frequencies and/or channels previously required for windowed revert repeater channel scheduling to be used as additional simplex uplink windowed revert repeater channels, increasing overall windowed revert repeater channel bandwidth in the system. Also, no outbound RF repeat frequency is needed to transmit the location updates to other subscriber units if a wireline data console is the sole target of the location updates.

Figure 6:
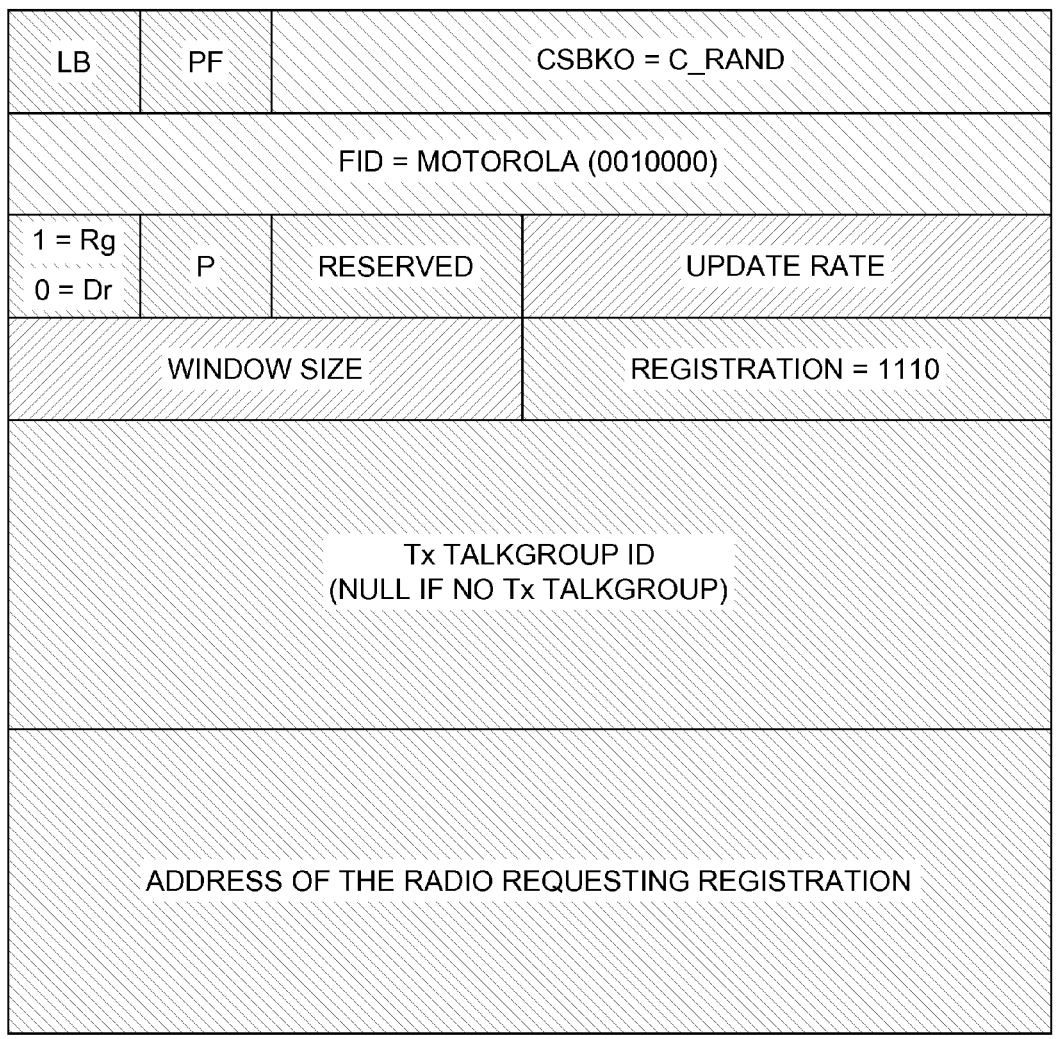
FIG. 6 is a block diagram of an exemplary announcement control signaling block (CSBK) for a registration request with the method of FIG. 5 in accordance with some embodiments.

The method 500 includes actions taken by a subscriber unit and infrastructure including a revert repeater, a location server, etc. In an exemplary embodiment, the method 500 can be performed by the radio communication system 100 with the infrastructure 110, the repeaters 120, 122, the subscriber unit 130, and the location server 140. Other implementations are also contemplated. The method 500 includes a subscriber unit, during registration or sometime thereafter, requesting a window (which can include a window number and windowed revert repeater channel) for data updates, i.e. transmitting a request (step 502). Also, the subscriber unit can make an explicit request for the window (i.e., window number and windowed revert repeater channel) for data updates. The window number and windowed revert repeater channel identifies a window when the subscriber unit can revert to the specific windowed revert repeater channel to transmit. The data updates can include location information such as GPS data which is sent on a recurrent basis. FIG. 6 illustrates an exemplary registration request CSBK 600 for a registration request with the method 500. The registration request CSBK 600 includes a last block (LB), a protect flag (PF), a CSBK Opcode (CSBKO), a feature set ID (FID), privacy (P), registration service, transmit talkgroup ID, and the address of the radio requesting registration service (i.e., the subscriber unit). Additionally, the registration request CSBK 600 is modified to include an update rate and a window size. The update rate is the interval at which the subscriber unit sends the data updates such as, for example, 7.5 s, 15 s, 30 s, 1 min, 2 min, 4 min, 8 min, and the window size is the size of each of the data updates.

Figure 7:
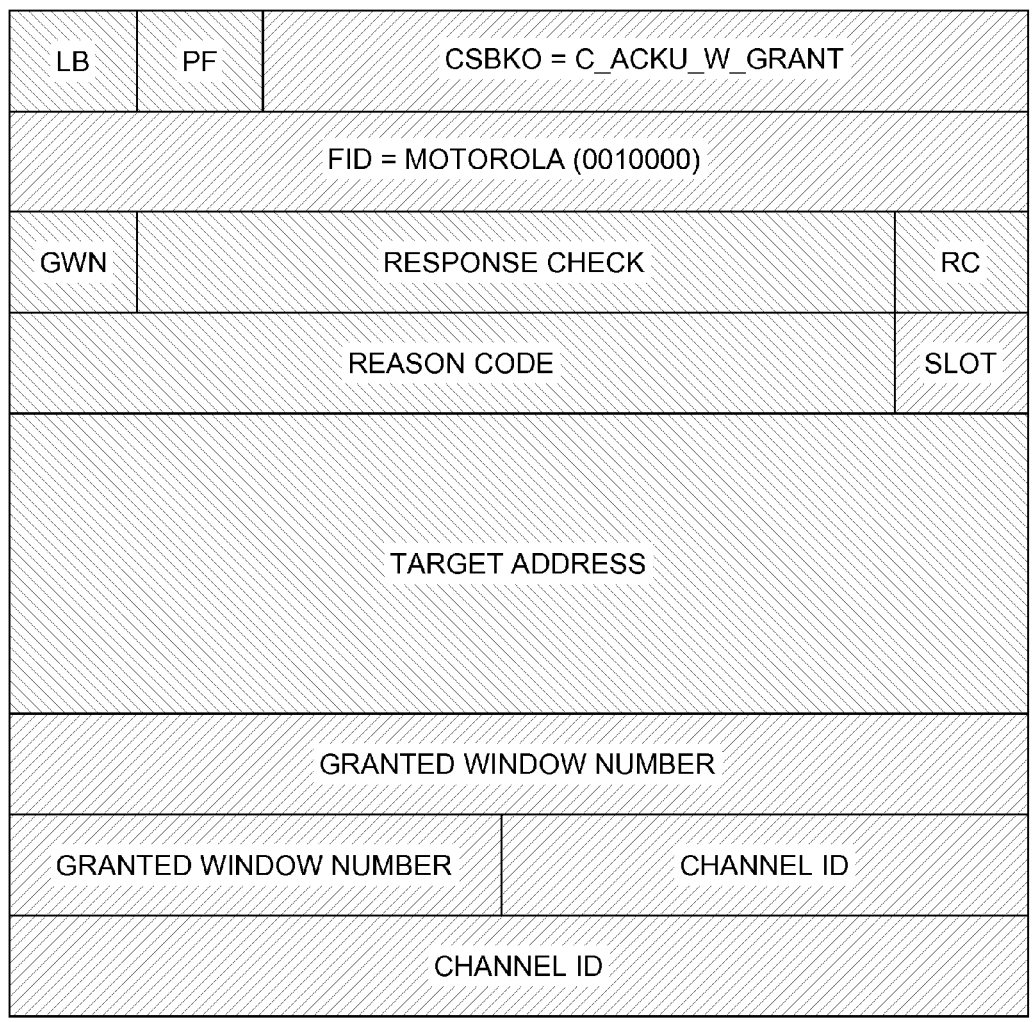
FIG. 7 is a block diagram of an exemplary registration response to the CSBK of FIG. 6 in accordance with some embodiments.

The method 500 includes the infrastructure providing a channel identifier (ID) in the registration response to inform the subscriber unit of an assigned windowed revert repeater channel (step 504). The channel ID is the associated channel identifier of the windowed revert repeater channel. Here, the method 500 includes the infrastructure determining the assigned windowed revert repeater channel based on the request. The infrastructure can determine the assigned windowed revert repeater channel based on a plurality of factors. These factors could include requested window size, update rate, revert data channel loading, revert repeater channel RF performance, SUID or transmit talkgroup ID, etc. FIG. 7 illustrates a registration response 700. The registration response 700 can be a registration response CSBK provided as a registration acknowledgment in response to the registration request CSBK 600. The registration response 700 includes the LB, PF, CSBKO, FID, a response check, a reason code (RC is the most significant bit of reason code), and target address. Additionally, the registration response 700 can include a granted window number (GWN is the most significant bit of granted window number), a granted revert repeater channel ID, and a granted revert repeater slot number to allow the subscriber unit to switch to the windowed revert repeater channel and slot number that is indicated in the response burst. Advantageously, the registration response 700 avoids the need to re-program the subscriber unit when new windowed revert repeater channel is added to the radio communication system 100 because the windowed revert repeater channel is added via OTA signaling instead of pre-programming the radio.

The subscriber unit calculates the physical frequency of the windowed revert repeater channel through the channel ID (step 506). The channel ID can be used by the subscriber unit to determine the physical transmit frequency in the radio communication system 100. The calculation here can be based on the specific protocols used in the radio communication system 100 such as, for example, as described in the ETSI DMR standards; although other protocols are also contemplated.

Next, the subscriber unit determines window information from the infrastructure (step 508). Again, all control channel repeaters and windowed revert channels are timing synchronized therebetween. For example, the infrastructure 110 and the repeaters 120, 122 can be synchronized, i.e. all windowed revert repeaters have synchronized windows. As such, the subscriber unit, monitoring a control channel over which the registration response CSBK is received on the control channel slot, can also monitor on the adjacent slot for current window number from window announcement CSBK 1000 or CACH short link LC window announcement 1100. The subscriber unit can anticipate when its assigned window is available such that it can move to the windowed revert repeater channel and transmit data during the window without first time synchronizing to the windowed revert repeater channel after switching to the windowed revert repeater channel.

Figure 8:
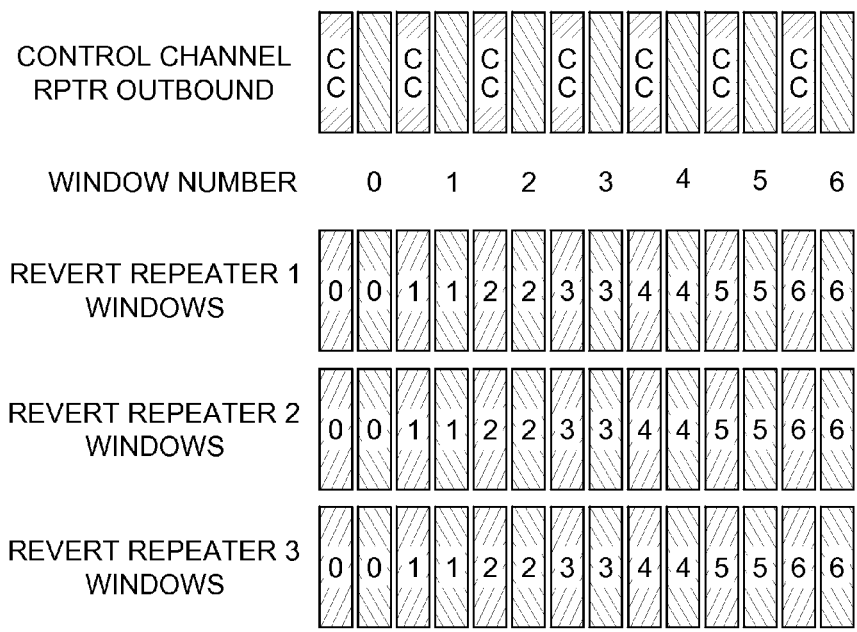
FIG. 8 is a timing diagram of an example of windowed revert repeaters and a control channel repeater having synchronized windows operating the method of FIG. 5 in accordance with some embodiments.

FIG. 8 illustrates a timing diagram 800 for an example of windowed revert repeater channels and a control channel having synchronized windows. The timing diagram 800 includes a control channel repeater 802 and windowed revert repeater channels 804, 806, 808 each in a windowed configuration. The windowed revert repeaters channels 804, 806, 808 can each be referred to as a windowed data channel. The timing diagram 800 is for a window size of 1. In the method 500, the control channel repeater 802 can broadcast the current window number (indicated by the numbers on the adjacent slot to the control channel) for each of the windowed revert repeater channels 804, 806, 808. As such, the subscriber unit can determine the status of the windows on the windowed revert repeater channels 804, 806, 808 and act appropriately. The control channel repeater 802 can broadcast the current window number on an adjacent slot through window announcement CSBK 1000 bursts or CACH Short LC window announcement 1100. A subscriber unit monitors the adjacent slot to the control channel or CACH short link control for current window number announcements in addition to normal control channel monitoring. The subscriber unit learns the timing of the windowed revert repeater channels from the control channel repeater and uses the information to deduce the exact timeslot/window to switch to the windowed revert repeater channel for transmission. Finally, for the data updates, the subscriber unit switches to the assigned windowed revert repeater channel for transmission thereon during the associated window(s) (step 510).

Figure 9:
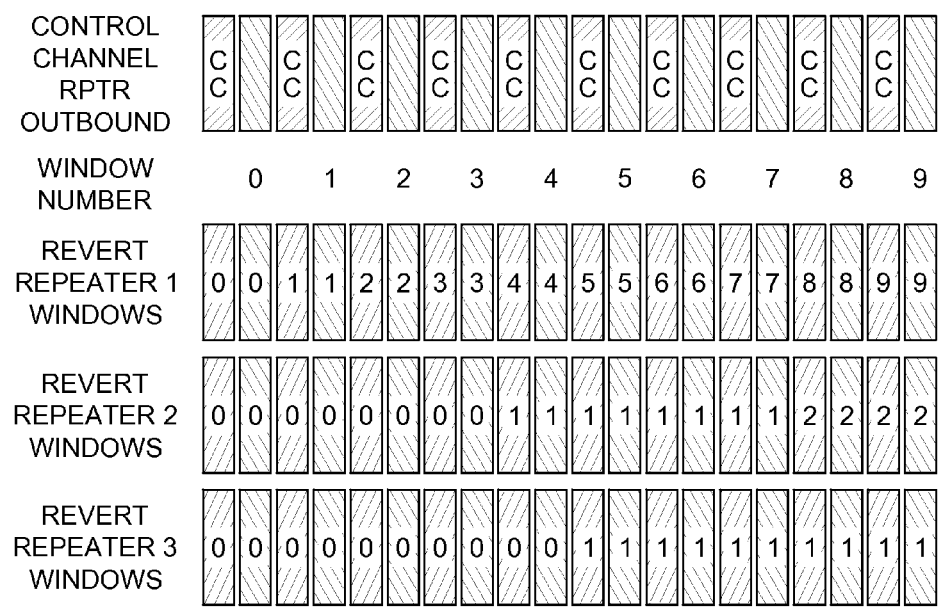
FIG. 9 is a timing diagram for an example of windowed revert repeaters and a control channel repeater having synchronized windows of various different sizes operating the method of FIG. 5 in accordance with some embodiments.

FIG. 9 illustrates a timing diagram 900 for an example of windowed revert repeater channels and a control channel channel 808 includes a window size of 5. To accommodate different window sizes on different windowed revert repeater channels 804, 806, 808, the announcement on the control channel repeater 802 can be based on window size 1 with the subscriber units knowing the different window sizes on the windowed revert repeater channels 804, 806, 808 and adjusting based on the different window sizes to determine its next attempt on its assigned window. For the adjusting, the control channel repeater 802 can broadcast current window number in increments of 1, while the different windowed revert repeater channels 804, 806, 808 can each have a window size of N, N being an integer, and the subscriber unit determines the next attempt on its assigned window based on the current window number and update rate.

Figure 10:
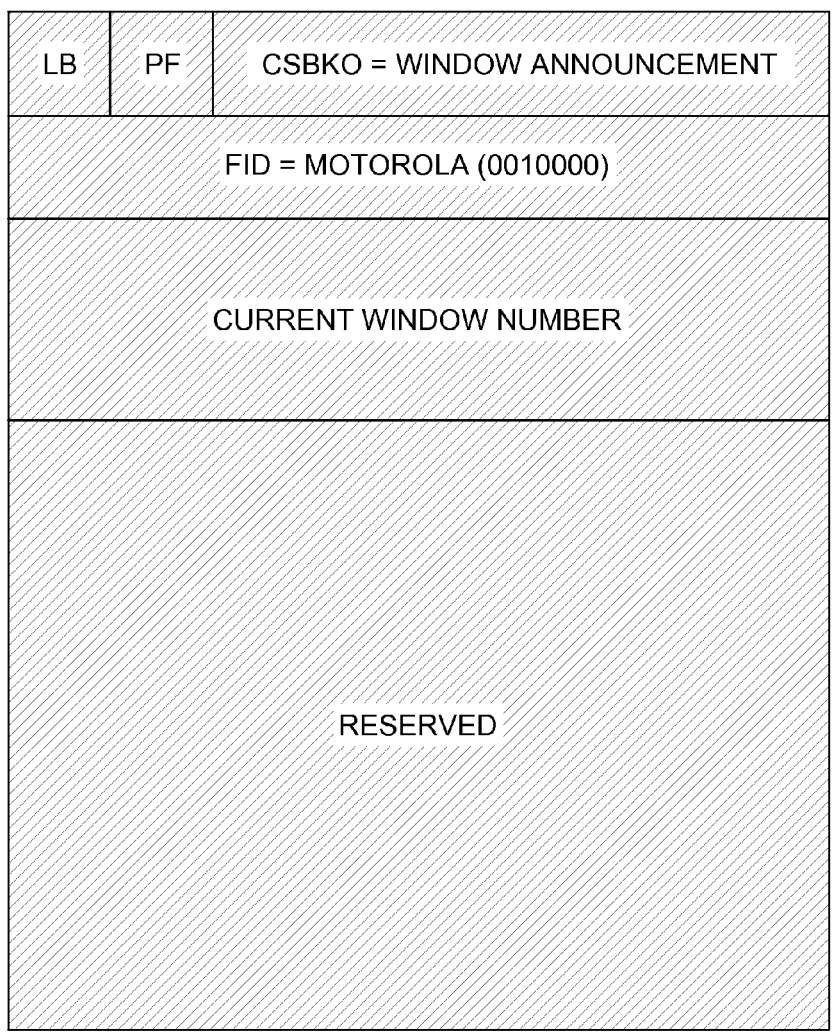
FIG. 10 is a block diagram of a CSBK announcement burst in accordance with some embodiments.
Figure 11A:
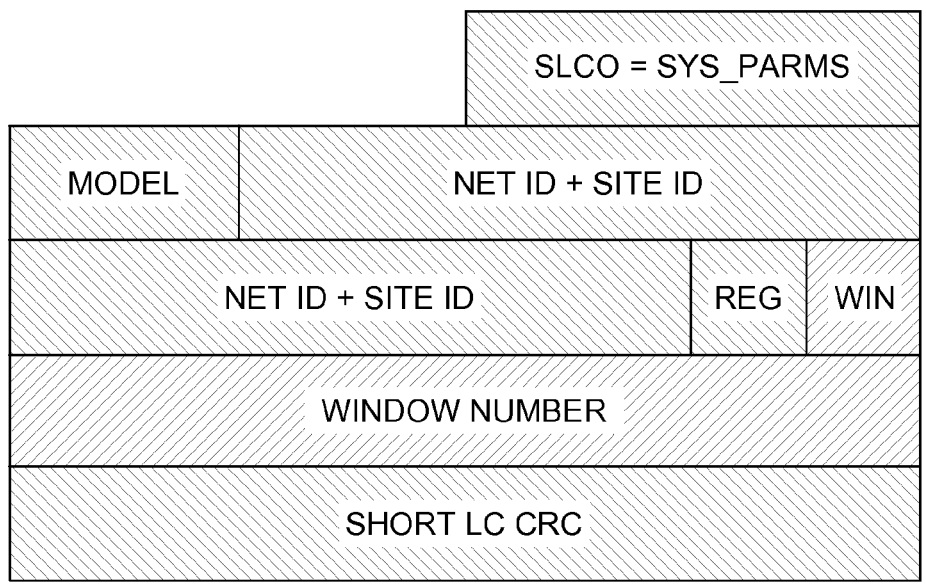
FIG. 11A is a block diagram of a CACH short LC for window broadcast in accordance with some embodiments.
Figure 11B:
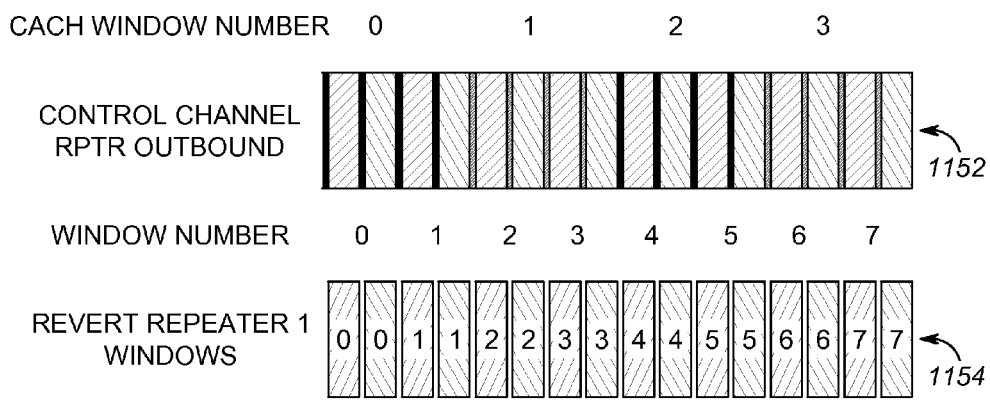
FIG. 11B is a timing diagram for an example operation using the CACH short LC of FIG. 11A for window broadcast in accordance with some embodiments.

FIG. 10 illustrates a block diagram of a CSBK 1000 for an announcement burst. Note, FIGS. 6, 7, and 10 all illustrate CSBKs with the CSBK 600 for a registration request, the CSBK 700 for a registration response, and the CSBK 1000 for a window announcement. The CSBK 1000 includes the LB, PF, CBKO (of a window announcement), and FID. The CSBK 1000 provides a broadcast of the current window numbers and window numbers up to a predetermined time. To accommodate different update rates such as, for example, 7.5 s, 15 s, 30 s, 1 min, 2 min, 4 min, 8 min, etc., the announcement burst can announce the window number up to the predetermined time (e.g., 8 min), which is: (8*60*1000) ms/60 ms=8000, i.e. in an exemplary embodiment, the CSBK 1000 can broadcast 8000 windows. The subscriber unit uses the broadcast window number to calculate the assigned window with consideration of update rate and granted window number. For example, assuming the 8000 windows, the next attempt window is computed as the [current attempt window number+(update rate in ms/60)]% 8000 (no. of windows). For the first transmission, the current attempt window number is replaced with the granted window number. As such, the subscriber unit will know, based on the broadcast current window number, when the next attempt window is for each update based on the foregoing calculation. Of course, the systems and methods contemplate other values. The following table illustrates an example of attempt windows relative to different update rates for an 8000 window system:

| Update Rate | Attempt | | | | | | | | | |
| --- | --- | --- | --- | --- | --- | --- | --- | --- | --- | --- |
| | 1st | 2nd | 3rd | 4th | 5th | 6th | 7th | 8th | 9th | 10th |
| 7.5 s | 0 | 125 | 250 | 375 | 500 | 625 | 750 | 875 | 1000 | 1125 |
| 15 s | 0 | 250 | 500 | 750 | 1000 | 1250 | 1500 | 1750 | 2000 | 2250 |
| 30 s | 0 | 500 | 1000 | 1500 | 2000 | 2500 | 3000 | 3500 | 4000 | 4500 |
| 1 min | 0 | 1000 | 2000 | 3000 | 4000 | 5000 | 6000 | 7000 | 0 | 1000 |
| 2 min | 0 | 2000 | 4000 | 6000 | 0 | 2000 | 4000 | 6000 | 0 | 2000 |
| 4 min | 0 | 4000 | 0 | 4000 | 0 | 4000 | 0 | 4000 | 0 | 4000 |
| 8 min | 0 | 0 | 0 | 0 | 0 | 0 | 0 | 0 | 0 | 0 | having synchronized windows of various different sizes. The timing diagram 900, similar to the timing diagram 800, includes the control channel repeater 802 and the windowed revert repeater channels 804, 806, 808. However, the windowed revert repeater channels 804, 806, 808 in FIG. 9 include different sized windows to accommodate different sizes of data from the subscriber units. For example, the windowed revert repeater channel 804 includes a window size of 1, the windowed revert repeater channel 806 includes a window size of 4, and the windowed revert repeater FIG. 11A illustrates a block diagram of a CACH short LC 1100 for window broadcast. The CACH short LC 1100 includes a short link control Opcode (SLCO), a network ID and site ID, and a short LC CRC. The CACH short LC 1100 can be used with an Opcode SYS_Parms to announce current window numbers, i.e. this can effectively announce the current window number of the windowed revert repeater channels. There can be a CACH short LC 1100 update every 2 timeslots 302 as shown in FIG. 3 and 9 bits are available for current window announcement, which is max of 511 windows. For optimum performance in some exemplary embodiments, the CACH short LC 1100 update 0 as window 0, 1 as window 2 and 2 as window 4 etc.; therefore, this can cover for 1022 windows, so it can support update rate up to 1 minute: (1*60*1000) ms/60 ms=1000 windows. FIG. 11B is a timing diagram for an example operation 1150 using CACH short LC 1100 for window number broadcast. The example operation 1150 includes a control channel repeater 1152 and a windowed revert repeater 1154. Specifically, the example operation illustrates the aforementioned functionality with respect to the CACH short LC 1100 which broadcasts the current window N as 2*M where M is the value broadcast in the CACH short LC 1100. As an example here based on 1000 windows, the next attempt window is the [current attempt window number+(update rate in ms/60)]% 1000 (no. of windows). For the first transmission, the current attempt window number is replaced with the granted window number. As such, the subscriber unit will know, based on the broadcast current window number, when the next attempt window is for each update based on the foregoing calculation. Of course, the systems and methods contemplate other values. The following table illustrates an example of attempt windows relative to different update rates for an 1000 window system:

|  | Attempt | | | | | | | | |
| --- | --- | --- | --- | --- | --- | --- | --- | --- | --- |
| Update Rate | 1st | 2nd | 3rd | 4th | 5th | 6th | 7th | 8th | 9th |
| 7.5 s | 0 | 125 | 250 | 375 | 500 | 625 | 750 | 875 | 0 |
| 15 s | 0 | 250 | 500 | 750 | 0 | 250 | 500 | 750 | 0 |
| 30 s | 0 | 500 | 0 | 500 | 0 | 500 | 0 | 500 | 0 |
| 1 min | 0 | 0 | 0 | 0 | 0 | 0 | 0 | 0 | 0 |

Figure 12:
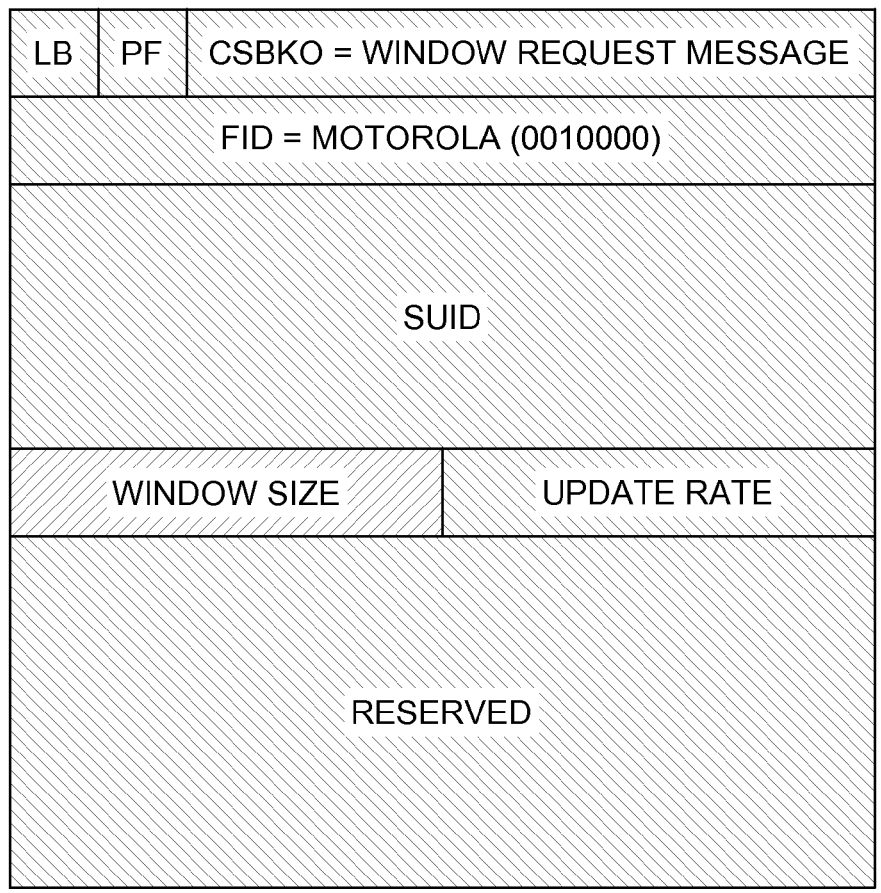
FIG. 12 is a block diagram of a CSBK and a table for additional window requests in accordance with some embodiments.

FIG. 12 illustrates a block diagram of a CSBK 1200 and a table 1202 for additional window requests via the adjacent slot to the control channel to avoid loading down the control channel inbound. Note, the CSBK 1200 is a similar format as the CSBKs 600, 700, 1000, but is illustrated for additional window requests. The CSBK 1200 includes the LB, PF, CSBKO with Opcode of a window request message, FID, and SUID. The CSBK 1200 also includes a window size and update rate. When the subscriber unit needs to request an additional window, it transmits the request message via the CSBK 1200 with the window size and update rate. The table 1202 illustrates exemplary rate information representations in the CSBK 1200.

Figure 13:
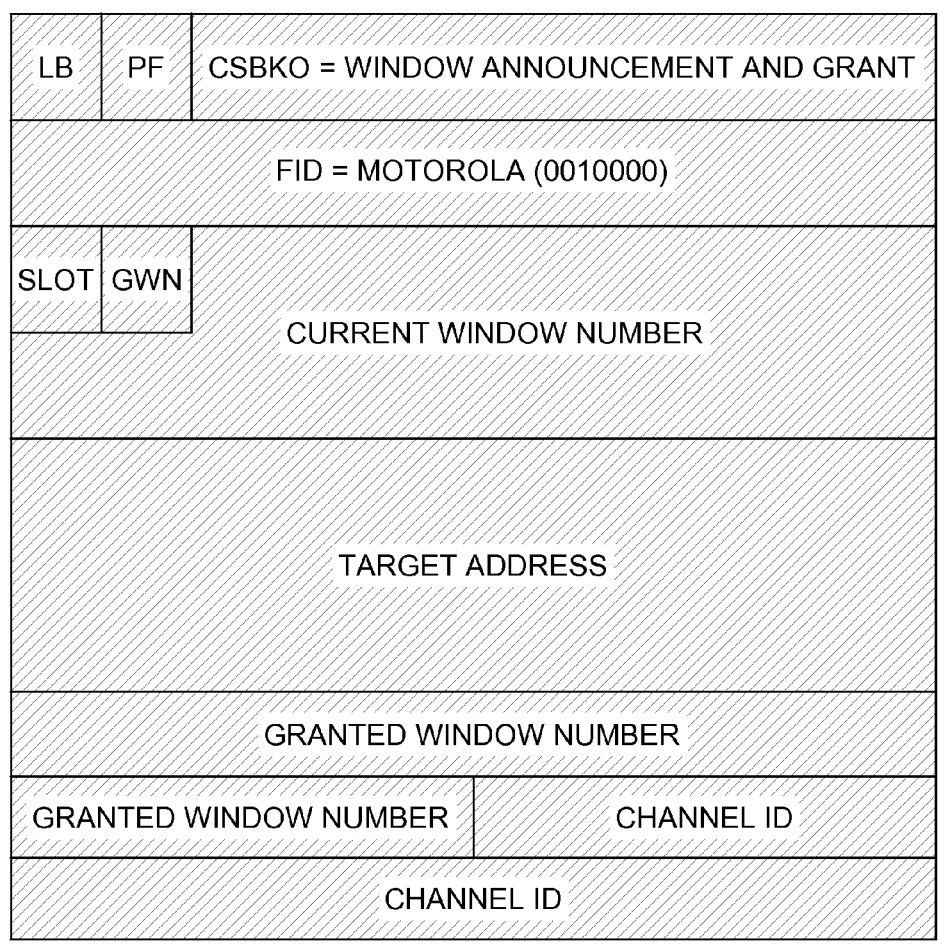
FIG. 13 is a block diagram of a CSBK transmitted to the subscriber unit in response to the CSBK of FIG. 12 for additional window requests in accordance with some embodiments.

FIG. 13 illustrates a block diagram of a CSBK 1300 transmitted to the subscriber unit in response to the CSBK 1200 for additional window requests. Again, the CSBK 1300 is a similar format as the CSBKs 600, 700, 1000, 1200, but is illustrated for a response to the additional window request. The CSBK 1300 includes the LB, PF, CSBKO with Opcode of a window announcement and grant, FID, and target addresses. The infrastructure such as the repeater broadcasts a grant via the CSBK 1300 with granted window number (GWN is the most significant bit of granted window number), granted repeater ID, granted slot number, and current window number. Note, all other subscriber units can also get the timing from the window grant burst via the CSBK 1300 since it provides the current window number. For example, the CSBK 1300 is used by the subscriber to request for additional windows to clear GPS data accumulated in the queue when the subscriber is involved in a voice call. There is no GPS data transmission when a subscriber is involved in a voice call, for example.

Figure 14:
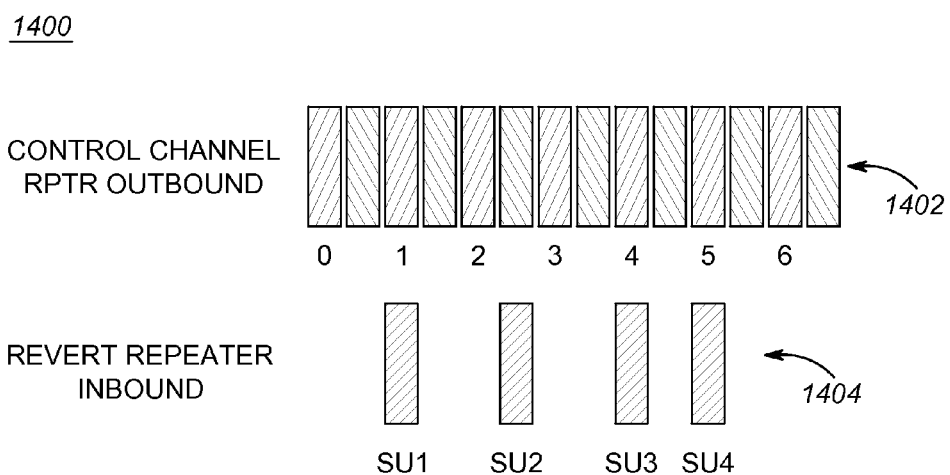
FIG. 14 is a timing diagram for an example operation of a control channel and revert repeater channel in accordance with some embodiments.

FIG. 14 illustrates a timing diagram for an example operation 1400 of a control channel 1402 and revert repeater channel 1404. The operation 1400 includes four exemplary subscriber units SU1, SU2, SU3, SU4 and a window size of 1. The subscriber units SU1, SU2, SU3, SU4 switch to the revert repeater channel 1404 at their assigned windows. For all window sizes of GPS data targeted to a wireline console, no repeated outbound signal is required to be transmitted. With this approach, outbound frequency can be eliminated, therefore the frequency usage is reduced by half. In other embodiments, the outbound frequency can be used as an additional inbound revert channel, increasing the data revert capacity of the system.

Figure 15:
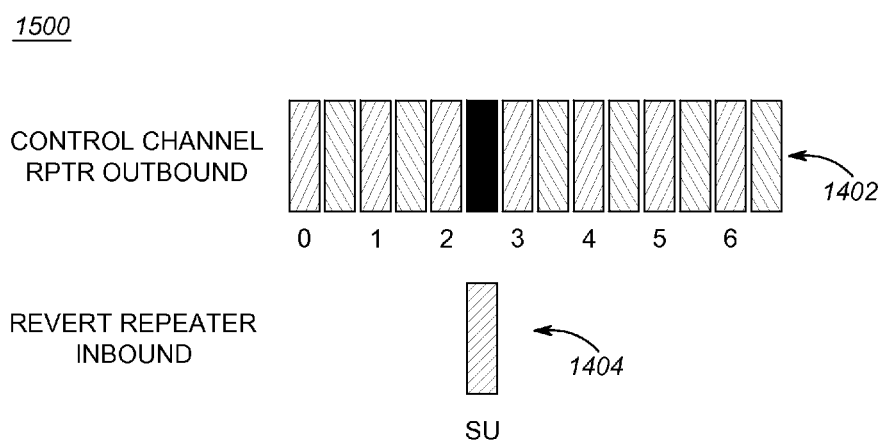
FIG. 15 is a timing diagram for an example operation of a control channel and revert repeater channel to describe late call entry in accordance with some embodiments.

FIG. 15 illustrates a timing diagram for an example operation 1500 of a control channel 1402 and windowed revert repeater channel 1404 to describe late call entry. One exemplary advantage of the method 500 is it avoids a subscriber unit having a late call entry due to location data transmissions. For example, location data transmissions can be via a GPS CSBK to a wireline console, e.g. the location server 140. With the method 500, the subscriber unit switches to the windowed revert repeater channel 1404 at the appropriate slot accurately to transmit a burst and return; therefore it is only away for one burst. From the example operation 1500, only the burst in black is missed by the subscriber unit. A normal voice grant is repeated twice with appropriate timing in between, so the subscriber unit will not miss any call due to a location data transmission. For GPS data or other data which is more than one burst, the system has knowledge of when a subscriber is away from the control channel. The radio communication system 100 knows the SUID and its affiliated talkgroup ID so it can optimize broadcast of channel grant to mitigate late entry, i.e., withhold the call grant until the system knows all associated subscribers of a talkgroup with a pending call grant are on the control channel. This method can be used for GPS data with one burst as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for enhanced data throughput on a windowed revert repeater channel in a radio communication system, the method comprising:
   requesting, by a subscriber unit and via a control channel of the radio communication system, a window in which to transmit data updates on the windowed revert repeater channel of the radio communication system;
   receiving, by the subscriber unit and via the control channel, an assigned window on the windowed revert repeater channel for the data updates;
   monitoring, by the subscriber unit, the control channel repeater and determining a timing of the windowed revert repeater channel based on the monitoring;
   reverting to the windowed revert repeater channel based on the timing and the assigned window, and transmitting the data updates during the assigned window; and
   receiving the assigned window on the control channel from infrastructure of the radio communication system with a slot number on the windowed revert repeater channel;
   reverting to the windowed revert repeater channel based on the timing to transmit in the assigned window for a long burst;
   returning to the control channel after the long burst; and
   holding a call grant for a talkgroup associated with the subscribed unit until the subscriber unit returns to the control channel.

2. The method of claim 1, further comprising:
   requesting the assigned window via a request during registration or via an explicit request subsequent to registration, wherein the request comprises an update rate and a window size associated with the data updates.

3. The method of claim 1, wherein the windowed revert repeater channel comprises one of a plurality of windowed revert repeater channels in the radio communication system, and wherein the subscriber unit is assigned to the windowed revert repeater channel and does not need to be reprogrammed when another windowed revert repeater channel is added to the radio communication system.

4. The method of claim 1, further comprising:
   determining a physical frequency of the windowed revert repeater channel based on its associated channel identifier.

5. The method of claim 1, wherein the control channel and the windowed revert repeater channel are synchronized therebetween, and wherein the determining of the timing of the window based on the monitoring comprises receiving window timing based on broadcasts on the control channel repeater including a current window number therein.

6. The method of claim 5, wherein the broadcasts comprise Common Announcement Channel (CACH) short Link Control (LC) transmissions or window announcement control signaling block (CSBK) with a current window number broadcast contained therein.

7. The method of claim 5, wherein the current window number broadcast is incremented in a window size of one, wherein the windowed data revert channel comprises a window size of N, N being an integer, and wherein the subscriber unit determines the next attempt window based on the current window number and update rate.

8. The method of claim 1, further comprising:
   reverting to the windowed revert repeater channel based on the timing to transmit in the assigned window for a single burst;
   returning to the control channel after the single burst; and avoiding a late entry into a new call due to a new call grant being repeated twice with appropriate timing in between and since the subscriber unit is away from the control channel for the single burst.

* * * * *